United States Patent
Bolyukh et al.

(10) Patent No.: US 8,756,619 B2
(45) Date of Patent: Jun. 17, 2014

(54) CLUSTER ANALYSIS OF VIEWER TENDENCIES

(75) Inventors: Yuriy Bolyukh, Trophy Club, TX (US); Ramprasath Hariharan, Tamil Nadu (IN); Syed Zafar Beyabani, Irving, TX (US); Anil Solleti, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 734 days.

(21) Appl. No.: 12/330,089

(22) Filed: Dec. 8, 2008

(65) Prior Publication Data

US 2010/0146530 A1  Jun. 10, 2010

(51) Int. Cl.
*H04H 60/33* (2008.01)

(52) U.S. Cl.
USPC .............................................. 725/14; 725/53

(58) Field of Classification Search
USPC ................ 725/9–21, 32, 34, 35, 37–40, 46
See application file for complete search history.

(56) References Cited

U.S. PATENT DOCUMENTS

| | | | |
|---|---|---|---|
| 7,657,907 B2* | 2/2010 | Fennan et al. | 725/46 |
| 2003/0101451 A1* | 5/2003 | Bentolila et al. | 725/34 |
| 2004/0177370 A1 | 9/2004 | Dudkiewicz | |
| 2007/0269787 A1 | 11/2007 | Cronstrom | |
| 2009/0055861 A1* | 2/2009 | Knoller et al. | 725/34 |
| 2010/0017814 A1* | 1/2010 | Archer | 725/34 |

FOREIGN PATENT DOCUMENTS

| | | |
|---|---|---|
| WO | WO-2007/026357 | 3/2007 |
| WO | WO-2008/102331 | 8/2008 |

* cited by examiner

*Primary Examiner* — Benjamin R Bruckart
*Assistant Examiner* — Jason Thomas

(57) ABSTRACT

A method performed by one or more computing devices includes determining a relevancy function of viewer tendencies based on set-top box data from a subscription television service and defining a cluster of set-top boxes based on the relevancy function. The method also includes building a tendency profile for the cluster, the tendency profile including predicted actions for viewers within the cluster. The method further includes assigning the set-top box to the cluster and directing a cluster-oriented presentation to a particular set-top box within the cluster.

20 Claims, 7 Drawing Sheets

|  | STB1 | STB2 | STB3 | STB4 | STB5 | STB6 | STB7 | STB8 | STB9 |
|---|---|---|---|---|---|---|---|---|---|
| TV PROGRAM 1 | 50 | 0 | 0 | 21 | 50 | 353 | 0 | 0 | 0 |
| TV PROGRAM 2 | 1 | 250 | 263 | 301 | 1 | 9 | 1 | 0 | 1 |
| VOD PROGRAM 1 | 0 | 0 | 0 | 1003 | 2 | 21 | 0 | 0 | 1002 |
| VOD PROGRAM 2 | 0 | 3 | 1 | 1007 | 1003 | 48 | 0 | 0 | 3 |
| TV CHANNEL 1 | 300 | 50 | 0 | 50 | 0 | 0 | 1 | 1900 | 1 |
| TV CHANNEL 2 | 50 | 400 | 875 | 821 | 1 | 1 | 3 | 0 | 3 |
| ACTOR 1 | 0 | 0 | 1 | 52 | 0 | 267 | 1 | 0 | 1002 |
| ACTOR 2 | 0 | 250 | 263 | 422 | 50 | 50 | 1 | 0 | 0 |

CLUSTER ANALYSIS OF VIEWER TENDENCIES

BACKGROUND INFORMATION

Television service providers, advertisers, and viewers may benefit from knowing particular viewing tendencies of viewers and/or groups of viewers within a subscription television service. Set-top boxes at customer premises may collect and store viewing histories that may be provided to backend servers for analysis.

BRIEF DESCRIPTION OF THE DRAWINGS

FIG. 7 is an exemplary table that illustrates an implementation of a relevancy function.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription television service to identify viewer's preference and associate the viewer preferences with preferences of other viewers to determine clusters of viewers with similar tendencies. Clusters, and a viewer's association therewith, may be adjusted dynamically based on viewer actions. A set-top box (STB) for the subscription television service may identify particular viewer actions (e.g., programs watched, searches performed, and/or programs ordered) and provide data over a network to a server for the subscription television service. The server may perform periodic analyses to account for changes in viewer's behavior.

As used herein, the terms "set-top box" or "STB" may refer to any media processing system that may receive multimedia content over a network, and may provide such multimedia content to an attached television. Also, as used herein, the terms "viewer," "user," and "customer" may refer interchangeably to a person who interacts with, views, listens to, or plays a multimedia program, video, and/or music (e.g., provided via a STB).

Figure 1:
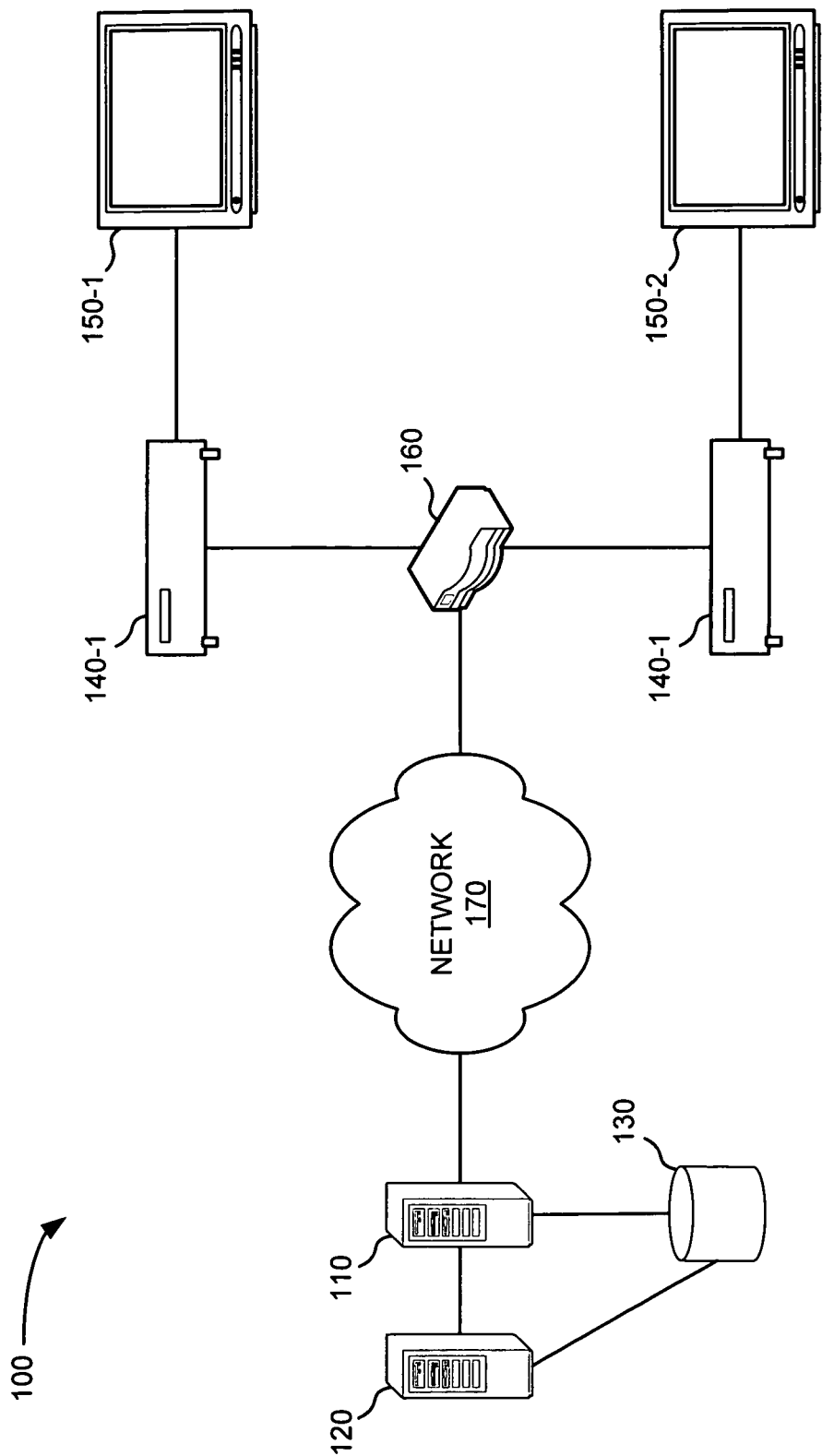
FIG. 1 depicts an exemplary network in which concepts described herein may be implemented.

FIG. 1 is a diagram of an exemplary network 100 in which concepts described herein may be implemented. As illustrated, system 100 may include a backend server 110, an analysis server 120, a database 130, STBs 140-1 and 140-2 (herein referred to collectively as "STBs 140" and generically as "STB 140"), televisions 150-1 and 150-2 (herein referred to collectively as "televisions 150" and generically as "television 150"), a local gateway 160, and a network 170. STBs 140, televisions 150 and gateway 160 may be located on a customer's premises and be connected via network 170 to server 110 at, for example, a subscription television service provider's premises. Components of network 100 may interconnect via wired and/or wireless connections. For simplicity, a single backend server 110, analysis server 120, database 130, network 170, and local gateway 160 with two STBs 140 and two televisions 150 have been illustrated in FIG. 1. In practice, there may be more networks, servers, local gateways, STBs, and/or televisions. Also, in some instances, one or more of the components of network 100 may perform one or more functions described as being performed by another one or more of the components of network 100.

In general, backend server 110 may provide control over (e.g., via network 170) telecommunication services for devices, such as televisions 150 and/or other network connectivity devices (e.g., Internet and telephone, not shown) provided at the customer's premises. As further shown in FIG. 1, backend server 110 may connect to a database 130 to store and/or retrieve customer data.

Backend server 110 may include one or more devices for providing content/information to STB 140 and/or television 150 in accordance with commands that are issued from STB 140. Examples of backend server 110 may include a headend device that provides broadcast television programs, a video-on-demand device that provides television programs upon request, and a program guide information server that provides information related to television programs available to STB 140. Backend server 110 may also receive information from one or more STBs, such as recorded information from STB 140 that may include viewing histories tracked by STB 140. Backend server 110 may store the information from the STBs in, for example, a database, such as database 130.

Analysis server 120 may include one or more server entities that are capable of performing statistical analysis on data stored, for example, in database 130. Analysis server 120 may retrieve data from database 130 to analyze the data and group STBs into clusters based on pattern analysis and correlation. While shown as separate components in FIG. 1, in other implementations backend server 110 and analysis server 120 may be combined as a single server.

Database 130 may maintain entries relating to subscribers' viewing histories. For example, database 130 may store information that server 110 receives from one or more STBs. In one implementation, database 130 may include exemplary fields, such as, a user-identification field, a date field, a time field, a channel field, and/or a program identification field. While only one database is shown in FIG. 1, database 130 may consist of multiple databases stored locally at server 110 and/or stored at one or more different and possibly remote locations. Database 130 may maintain additional or different information relating to information regarding programs watched by viewers. In another implementation, for example, the date field, the time field, the channel field, and/or the program identification field may be replaced with a single field that stores an identifier that represents the date, time, channel, and identification of a program to which a STB (such as STB 140) was tuned.

STB 140 may include a device for selecting and/or obtaining content that may be shown or played on television 150. STB 140 may receive a television signal from gateway 160, may convert the signal to a form usable by television 150, and may transmit the signal to television 150 for display. STB 140 may further allow a user to alter the programming provided to television 150 based on a signal (e.g., a channel up or channel down signal) from, for example, a remote control (not shown). STB 140 may also be capable of sending data to server 110.

In one implementation, STB 140 may track information relating to programs provided to television 150. In another implementation, STB 140 may track information relating to programs output to other devices (not shown), such as a video cassette recorder (VCR), a digital video recorder (DVR), external storage device, or a remote streaming video viewing device. STB 140 may provide some or all of the tracked program viewing information to a server, such as backend server 110. STB 140 may also obtain tracked program viewing information and provide the obtained program viewing information to television 150. STB 140 may obtain tracked program viewing information from an internal memory and/or from backend server 110.

Television 150 may include a digital or analog television through which a user may watch television programming. Television 150 may refer to any device that can receive and display multimedia content delivered over network 170 for perception by users. Television 150 may include technologies such as cathode ray tube (CRT) displays, liquid crystal displays (LCDs), light-emitting diode (LED) displays, plasma displays and any attendant audio generation facilities.

Gateway 160 may include a network device that provides an interface from network 170 to televisions 150 and other network connectivity devices (not shown). For example, when telecommunication services are provided to the customer's premises via an optical fiber, gateway 160 may include an optical network terminal (ONT) that connects to the optical fiber. The ONT may convert between signals appropriate for television 150 and signals appropriate for transmission over optical fiber. For example, the ONT may include a coaxial cable connection that leads to television 150 or STB 140. The ONT may also include an Ethernet output port that connects to a personal computer or a VoIP telephone and/or a standard telephone port for connecting to a standard telephone.

Gateway 160 may include one of a number of possible gateway devices, including a satellite antenna and receiver, a coaxial cable connection, an ONT, or a broadband access for Internet protocol TV (IPTV). The satellite antenna and receiver may provide an interface for television service broadcast from satellites. The coaxial cable connection may provide an interface for television service connected to a consumer via coaxial cables. The ONT may provide an interface for an optical fiber connection. The broadband IPTV access may generally include any device that provides broadband access over which television service may be provided.

Network 170 may include a local area network (LAN), a wide area network (WAN), such as a cellular network, a satellite network, or the Internet, a private WAN, or a combination of the Internet and a private WAN, etc. that is used to transport data. Although shown as a single element in FIG. 1, network 170 may include a number of separate networks that function to provide services to devices, such as television 150, at a customer's premises. In one implementation, network 170 may terminate at the customer's premises via an optical communication link, such as an optical fiber provided to the customer's premises. In another possible implementation, network 170 may terminate at the customer's premises via a coaxial cable. In still another implementation, network 170 may terminate at the customer's premises via a wireless (e.g., satellite) connection.

In an exemplary implementation, television 150 and STB 140 may be connected through one or more audio/video (AV) devices (not shown), such as an audio/video receiver, a video amplifier, video switches, a videocassette recorder (VCR), and/or a digital video disc (DVD) players. In general, AV devices may represent any audio or video equipment that a customer installs to provide additional audio/video capabilities or to enhance the capabilities of existing equipment. Additionally, although two STBs 140 and televisions 150 are shown in FIG. 1, any particular customer's premises may include any number of devices capable of displaying multimedia content. Further, although two televisions for a single customer's premises is shown in FIG. 1, server 110 may interact with many customers' premises and/or their STBs and televisions.

In implementations described herein, backend server 110 may receive viewing history data from STBs 140 and store the data in database 130. Analysis server 120 may determine a relevancy function of viewer tendencies based on the viewing history data and define clusters of set-top boxes based on the relevancy function. Analysis server 120 and/or backend server 110 may then build tendency profiles for each of the clusters, so that each of the tendency profiles include predicted actions for viewers within each of the clusters. Based on the tendency profiles, backend server 110 may direct a cluster-oriented presentation to set-top boxes within the clusters.

Figure 2:
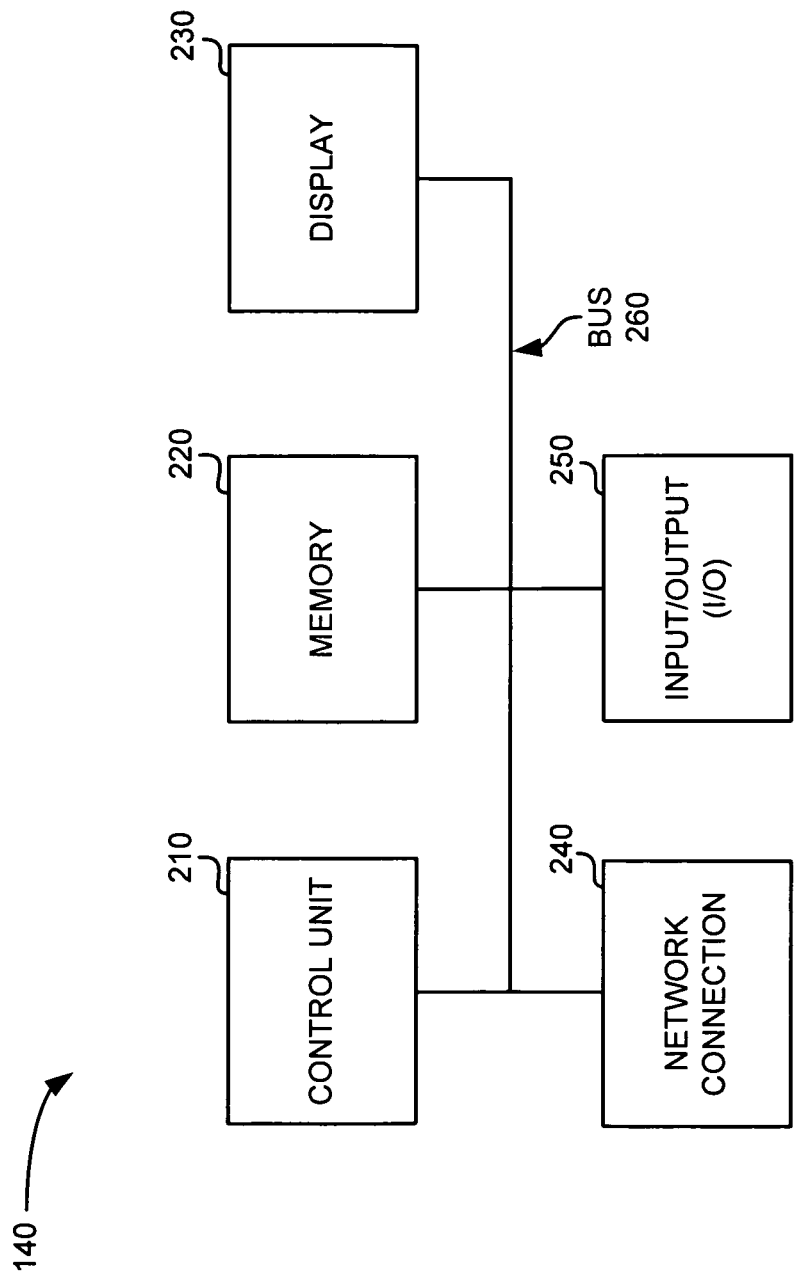
FIG. 2 is a block diagram of exemplary components of a set-top box that may be used in the network of FIG. 1.

FIG. 2 is diagram illustrating exemplary components of STB 140. As shown, STB 140 may include a control unit 210, memory 220, a display 230, a network connection 240, an input/output (I/O) component 250, and a bus 260.

Control unit 210 may include a processor, microprocessor, or other type of processing logic that may interpret and execute instructions. Among other functions, control unit 210 may collect and store viewer activity associated with television programming. Control unit 210 may execute instructions to send viewing history information to another device, such as backend server 110. Control unit 210 may also receive information and/or instructions from other devices, such as backend server 110.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store viewing history information to send at a later point in time, such as when requested by backend server 110 or at a particular interval.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), image, and/or video information. Display 230 may be an optional component.

Network connection 240 may include any transceiver-like mechanism that enables STB 140 to communicate with other devices and/or systems. For example, network connection 240 may include an Ethernet interface, an optical interface, a coaxial interface, a radio interface, or the like. Network connection 240 may allow for wired, wireless, and/or optical communication. Network connection 240 may be configured to connect STB 140 to a packet-based IP network.

Input/output devices 250 may generally include user input devices such as external buttons and output devices such as a display or printer. With input/output devices 250, a user may generally interact with STB 140. In some implementations, input/output devices 250 may be implemented via a remote control. Bus 260 may provide an interface through which components of STB 140 can communicate with one another.

As will be described in detail below, STB 140 may perform certain operations relating to recording and communicating a history of viewer activities to a server, such as backend server 110. STB 140 may perform these operations in response to control unit 210 executing software instructions contained in a computer-readable medium, such as memory 220. A computer-readable medium may be defined as a physical or logical memory device.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of STB 140, in other implementations, STB 140 may include fewer, additional, different and/or differently arranged components than those depicted in FIG. 2. In still other implementations, one or more components of STB 140 may perform one or more other tasks described as being performed by one or more other components of STB 140.

Figure 3:
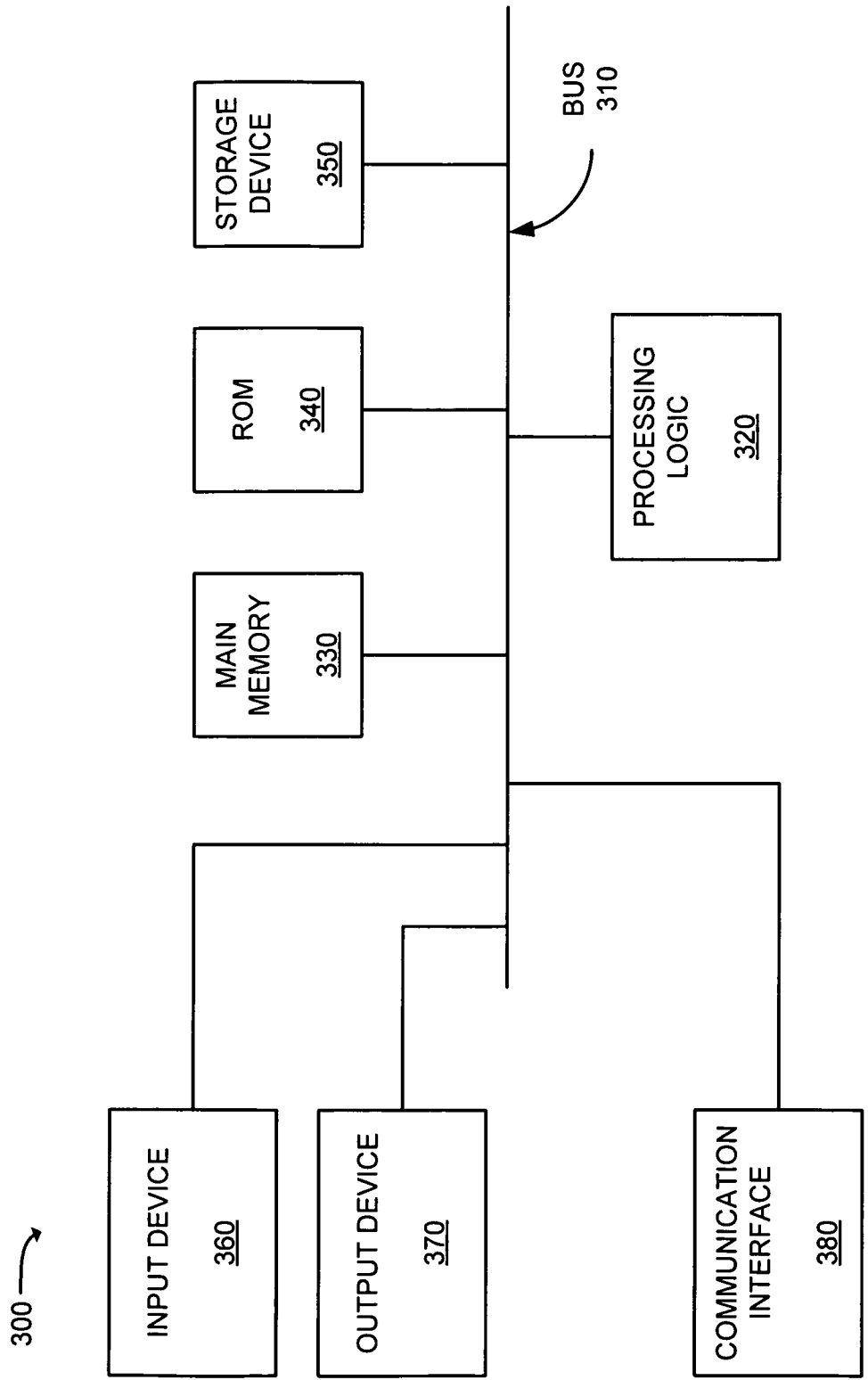
FIG. 3 a block diagram of exemplary components of a device that may correspond to the backend server and/or analysis server of FIG. 1.

FIG. 3 is a diagram of exemplary components of a device 300 that may correspond to backend server 110 and/or analysis server 120. As illustrated, device 300 may include a bus 310, processing logic 320, a main memory 330, a read-only memory (ROM) 340, a storage device 350, an input device 360, an output device 370, and a communication interface 380.

Bus 310 may include a path that permits communication among the components of device 300. Processing logic 320 may include a processor, microprocessor, or other type of processing logic, such as an application-specific integrated circuit (ASIC), field-programmable gate array (FPGA), etc., that may interpret and execute instructions.

Main memory 330 may include a RAM or another type of dynamic storage device that may store information and instructions for execution by processing logic 320. ROM 340 may include a ROM device or another type of static storage device that may store static information and instructions for use by processing logic 320. Storage device 350 may include a magnetic and/or optical recording medium and its corresponding drive. In one implementation, storage device may include database 130. Storage device 350 may store viewer activity history for particular STBs or all STBs associated with a subscription television service provider.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems, such as STB 140.

As will be described in detail below, device 300 may perform certain operations associated with performing cluster analysis of viewer data for a subscription television service. Server 110 may perform these and other operations in response to processing logic 320 executing software instructions contained in a computer-readable medium, such as main memory 330.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of device 300, in other implementations, device 300 may include fewer, additional, different and/or differently arranged components than those depicted in FIG. 3. In still other implementations, one or more components of device 300 may perform one or more other tasks described as being performed by one or more other components of device 300.

Figure 4:
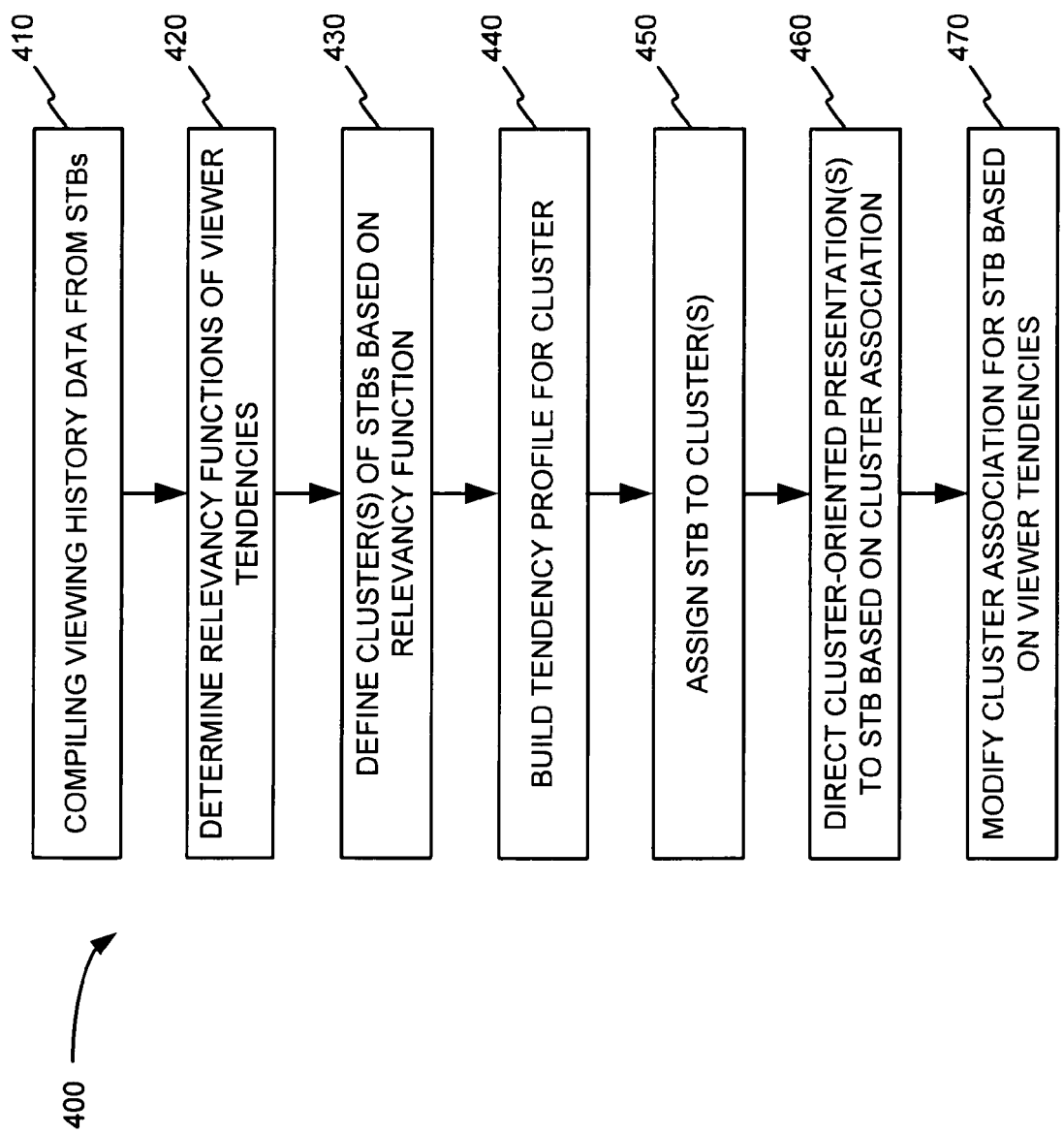
FIG. 4 is a process flow illustrating exemplary operations to perform a cluster analysis of viewer data.

FIG. 4 provides a process flow 400 illustrating exemplary operations to perform a cluster analysis of viewer data. The operations may be performed by one or more servers associated with a subscription television service, such as backend server 110 and/or analysis server 120. Process 400 may begin with compiling viewing history data (block 410). For example, backend server 110 may collect viewer history information from various STBs, such as STBs 140. Backend server 110 may compile and sort the collected viewer history information locally and/or in a database, such as database 130.

Figure 5:
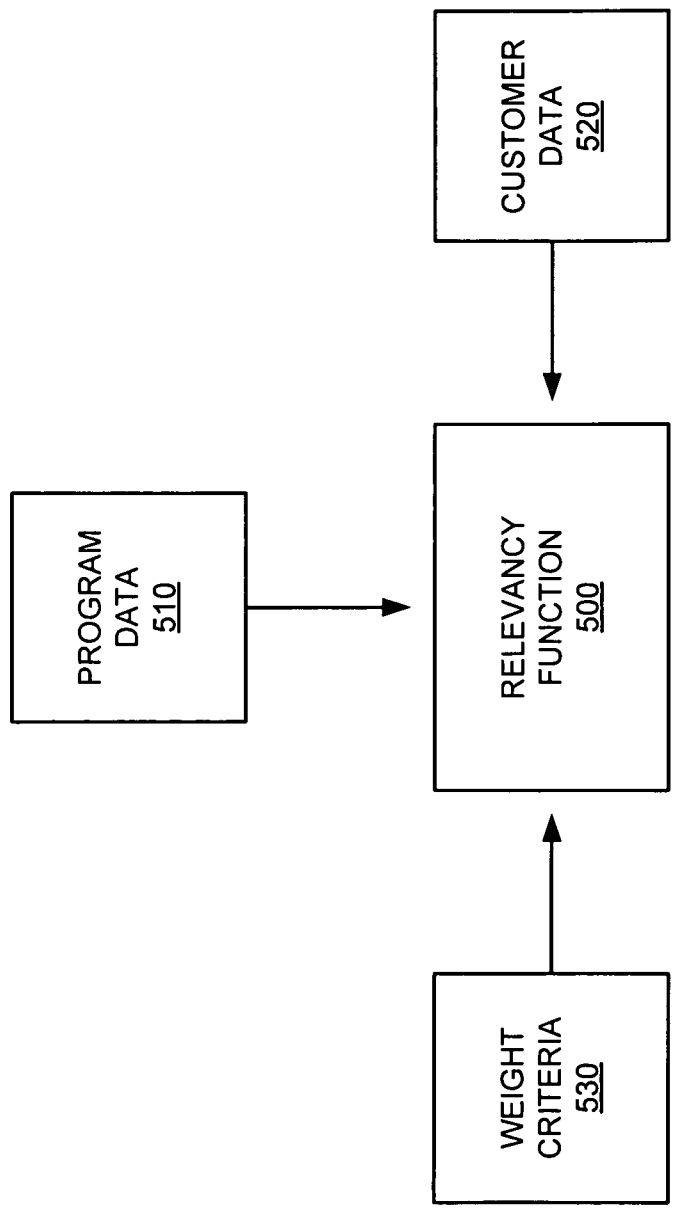
FIG. 5 is a diagram of exemplary factors of a relevancy function.
Figure 6:
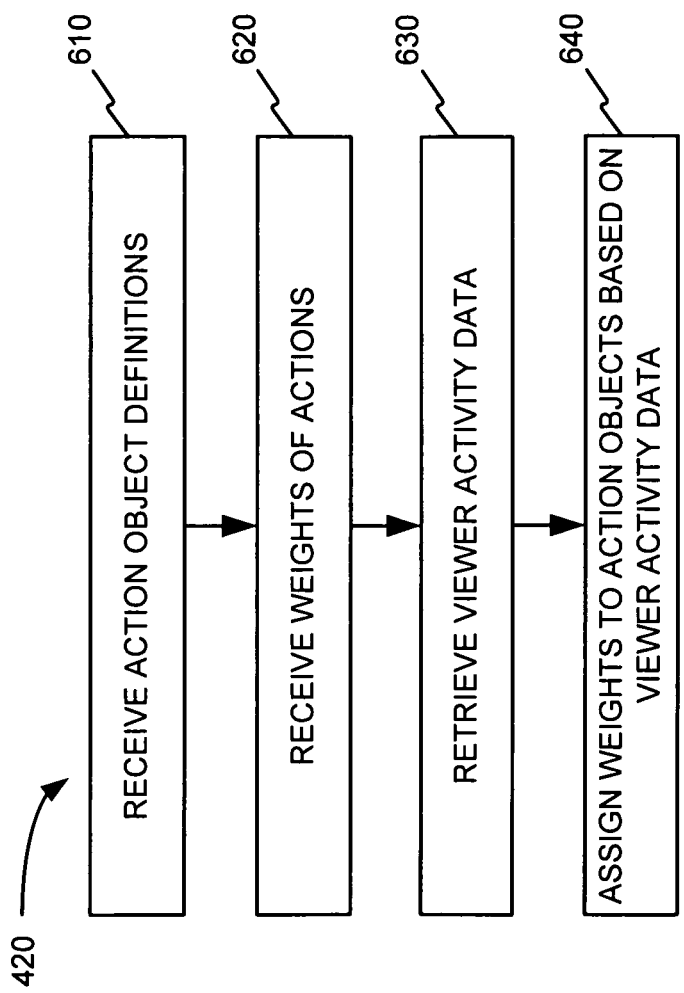
FIG. 6 is a process flow illustrating exemplary operations for the determining of relevancy functions of viewer tendencies of FIG. 4.

Relevancy functions of viewer tendencies may be determined (block 420). For example, analysis server 120 may determine a relevancy function based data from viewers and data collected from programming content. The relevancy function is described further with respect to FIGS. 5 and 6. FIG. 5 shows exemplary factors for relevancy function 500. FIG. 6 is a process flow illustrating exemplary operations for the determining of relevancy functions of viewer tendencies of FIG. 4.

Referring to FIG. 5, the relevancy function may be determined based on various input, including television program data 510, customer data 520, and weight criteria 530. Television program data 510 may include particular programming or information about the programming offered by a subscription television service. In an exemplary implementation, program data 510 may be separated into action objects, which may include any programming that a viewer could view, search, record and/or purchase through a STB. For example, action objects may include particular television programs, channels, VOD offerings, PPV offerings, electronic program guide (EPG) searches/selections, and the like. In another implementation, action objects may include subsets of other programming information, such as genres, actors, premieres, etc.

Customer data 520 may include viewer history information gathered from STBs (e.g., STB 140). Viewer history information may include actions performed by a user that can be recorded by the STB, such as selecting a television program, conducting a search on an EPG, viewing a description of a program on an EPG, purchasing a VOD or PPV product, and the like. In an exemplary implementation, actions by a viewer may be recorded by the STB and associated with the STB as customer data 520. When customer data 520 is sent to the premises of the subscription television provider, recorded actions in customer data 520 may be associated with action objects in the program data. A single viewer action may correspond to more than one action object.

Weight criteria 530 may include values (e.g., a real number) for applying customer use data 520 to the program data 510. A value may be assigned to each action object based on a user action. In determining the relevancy function, particular viewer actions may be weighted more heavily than others. For example, action objects from an EPG search result may be given a relatively low weight (e.g., 1). If a user views a description of a particular item from an EPG search, that action object may be assigned a higher weight (e.g., 2). A viewed TV program may be assigned a distinctly higher weight (e.g., 50); and a purchased program (e.g., VOD or PPV) may be assigned an even higher weight (e.g., 1000). The weight criteria values (e.g., 1, 2, 50, 1000) may be adjusted based on the proportionate importance ascribed to each type of user activity. The weight criteria may be supplied by, for example, a system administrator for the subscription television service and adjusted as desired.

FIG. 6 illustrates exemplary operations associated with the determination of relevancy functions of viewer tendencies of block 420 of FIG. 4. The operations may, for example, be performed by a server for a subscription television service (e.g., analysis server 120). The process may begin by receiving action object definitions (block 610). For example, analysis server 120 may receive action object definitions that may include particular programming, channels, VOD shows, PPV shows, games, etc. In an exemplary implementation, an action object may be any content offered by a subscription television service that a viewer could view, search, record and/or purchase through a STB. The action object definitions may be provided to analysis server 120 by a system administrator (using, e.g., input device 360) or downloaded from another server (using, e.g., communication interface 380).

Weights of actions may be received (block 620). For example, analysis server 120 may receive weights of action that a user may perform and that a STB may record. Actions may include, for example, a conducting search (e.g., a keyword search using an EPG), viewing an item description in a search results list, selecting a program to watch (e.g., either from a search results list, a programming list, or simply entering a channel number), and/or purchasing programming content (such as VOD, PPV or interactive games). Each action may have a relative weight. For example, a search action may provide relatively small guidance toward a viewer's tendencies; and thus a search action may be given a value of "1." In contrast, a VOD purchase may provide a strong indication of a viewer's tendencies; and thus a VOD purchase may be given a value of "1000." The action weights may be provided to analysis server 120 by a system administrator (using, e.g., input device 360) or downloaded from another server (using, e.g., communication interface 380).

Viewer activity data may be retrieved (block 630). For example, analysis server 120 may retrieve viewer activity data from a database, such as database 130, or another component that stores viewer history data. The view history data may be a compilation of information that is provided by some or all STBs for a subscription television service.

Weights may be assigned to action objects based on viewer actions (block 640). For example, analysis server 120 may assign weights to action objects that the viewer history data indicates has activity from a viewer. Weights may be assigned to each action, based on the perceived value that the actions contribute to indicating a user's tendencies. For example, a weight of "1" may be assigned to each search result when a viewer conducts a search (such as a keyword search using an EPG) performed by a viewer. A weight of "2" may be assigned to any of the search results that a viewer selects to view the programming description. A weight of "50" may be assigned to a particular program watched by a viewer (e.g., that remained tuned on the STB for at least a particular time period). A weight of "1000" may be assigned to a particular VOD program purchased by a viewer. The above weight values are illustrative, and the values may be modified as necessary to better determine viewer tendencies.

Returning to FIG. 4, clusters of STBs may be defined based on the relevancy function (block 430). For example, analysis server 120 may identify groups of STBs 140 based on the weighted relevancy function. For example, a global group may include the tendencies of all subscriber STBs 140. Other groups (also referred to herein as "clusters") may be identified within the global group. For example, certain groupings may become apparent based on types of weighted action objects from each STB 140 viewer history. Furthermore, subgroups may be identified within larger groups to form a hierarchy of STB clusters. In another implementation, an individual STB 140 viewer history may include sufficient unique information to form an individual cluster (i.e., a cluster of a single STB).

A tendency profile may be built for the cluster (block 440). For example, once a group is defined, analysis server 120 may indicate viewing tendencies for that particular group. A tendency profile may include predicted actions for viewers within the cluster. For example, some clusters may have a viewing history dominated by family movies and educational programs. Such tendencies may be indicative of households with small children, for example, that would likely be interested in other child-oriented programming. As another example, some clusters may have different time-based tendencies, such as viewing sports-oriented programs during some weekend periods and viewing cooking-oriented programming during a mid-week period. Other patterns may be identified, including times of peak use within a cluster, types of programming associated with a cluster, preferred channels, programming variations between timeslots, etc. These patterns may be used to determine tendencies for particular clusters.

A STB may be assigned to one or more clusters (block 450). For example, backend server 110 may send one or more cluster identifiers to STB 140. A cluster identifier may be a character string and/or number that identifies a cluster. STB 140 may store the cluster identifiers and include them in messages to backend server 110. In an exemplary implementation, each STB 140 may be assigned to a hierarchy of groupings including a global grouping, one or more clusters, and an individual STB. Thus, STB 140 may store more than one cluster identifier.

A cluster-oriented presentation(s) may be directed to an STB based on the cluster association (block 460). For example, based on the cluster association of a particular STB, the subscription television service (e.g., backend server 110) may provide cluster-oriented presentations to individual STBs. Cluster-oriented presentations may generally include viewing suggestions and/or advertising directed toward a viewer. Examples of cluster-oriented presentations may include the movies which may be listed first in VOD advertising or in a VOD poster view, the weight (and order of listing) assigned to search results from an EPG search, and/or the ranking of recommended television programming. In an exemplary implementation, data for cluster-oriented presentations may be sent from back-end server to a particular STB based on a cluster identifier that can be included in requests from the STB.

In one implementation, cluster-oriented presentations for STB 140 may be based on the most specific group within the hierarchy of groupings assigned to STB 140. For example, STB 140 may have an individual STB profile, a cluster tendency profile, and a global tendency profile. A viewer may use STB 140, for example, to conduct a keyword search using an EPG. STB 140 may associate the keyword with an action-object under an assigned grouping to weight search results accordingly. STB 140 may first attempt to apply the individual STB profile. If no information about the action-object is available in the individual STB profile, STB 140 may then attempt to apply the cluster tendency profile, and then (if necessary), the global tendency profile.

A STB's cluster association may be modified based on the viewer's tendencies (block 470). For example, analysis server 120 may adjust the cluster association of a STB based on subsequent actions by a viewer. Analysis server 120 may remove a STB from a cluster, add a STB to another cluster, or generate a new cluster. How closely a STB may be associated with a cluster may be decided, for example, based on a viewer's interaction with cluster-oriented presentations (e.g., a selection of an item near the top of a cluster-oriented search list, VOD program list, etc.) and/or the STB's continuing conformance with the tendency profile of the cluster. In an exemplary implementation, each STB may be associated with a hierarchy of tendency profiles. For example, a STB may be included with the global relevancy function, a cluster related to family-programming, and an individual STB profile. In some implementations a STB may be associated with multiple clusters and or sub-clusters. In exemplary implementations, analysis server 120 may apply a Bayesian feedback loop or another statistical inference model to modify a STB's cluster association. In some implementations, analysis server 120 may receive updated STB data and adjust the cluster association of a STB daily or multiple times within a single day.

FIG. 7 provides an exemplary table 700 to represent an implementation of a relevancy function. As shown in FIG. 7, the relevancy function may be represented as table 700 having action objects 710 on row titles, STB numbers 720 on column titles, and object weights 730 for the STBs in each cell. In the example of FIG. 7, data for eight action objects (TV Program 1, TV Program 2, VOD Program 1, VOD Program 2, TV Channel 1, TV Channel 2, Actor 1, and Actor 2) and nine STBs (STB1, STB2, STB3, STB4, STB5, STB6, STB7, STB8, and STB9) is shown. In practice, numerous action objects and STBs may be included in table 700. In one implementation, viewer history data for each STB of a provider's subscription television service may be included in table 700.

For simplicity, table 700 includes a relatively small sample size of data for each STB. Weights 730 may be applied to each action object 720 based on actions reported in viewer history for each STB. In the example of FIG. 7, weights may be applied in increments of 1, 2, 50, and 1000, as described above with respect to block 630 of FIG. 6. A weight of 1 is assigned to each viewer's search result; a weight of 2 is assigned to viewed program descriptions; a weight of 50 is assigned to a watched program; and a weight of 1000 is assigned to a purchased VOD program.

Data from STB1 includes a weight of 50 for "TV Program 1," indicating that viewer(s) of STB1 watched "TV Program 1" one time. Data from STB1 also includes a weight of 300 for "TV Channel 1," indicating (for example) that viewer(s) of STB1 watched "TV Channel 1" several times and/or that "TV Channel 1" was a popular search result for viewer(s) of STB1. Table 700 also indicates that viewers at STB2, STB3, and STB4 are relatively frequent viewers of "TV Program 2," "TV Channel 2," and "Actor 2." It may be that "TV Program 2" is broadcast on "TV Channel 2" and includes "Actor 2." Data from STB4 also includes a weight of 1003 for "VOD Program 1" and 1007 for "VOD Program 2," indicating that viewer(s) of STB4 probably purchased both "VOD Program 1" and "VOD Program 2" one time.

Data from STB5 includes a weight of 1003 for "VOD Program 2," indicating that viewer(s) of STB5 probably purchased "VOD Program 2" one time. Data from STB6 includes weights of 21 and 48 for "VOD Program 1" and "VOD Program 2," respectively, indicating (for example) that viewer (s) of STB6 appear to have frequent searches including "VOD Program 1" and/or "VOD Program 2" in the search results. Data from STB6 also includes a weight of 353 for "TV Program 1," indicating (for example) that viewer(s) of STB6 watched "TV Program 1" several times and/or that "TV Program 1" was a popular search result for viewer(s) of STB6.

Data from STB7 includes a weight no significant weights, indicating that viewer(s) of STB5 may be new subscribers. Data from STB8 includes a weight of 1900 for "TV Channel 1," indicating that viewer(s) of STB8 may keep STB 8 tuned to a single channel. Data from STB9 includes a weight of 1002 for "VOD Program 1" and a weight of 1002 for "Actor 1," indicating that viewer(s) of STB9 probably purchased "VOD Program 1" one time. VOD Program 1 may have included "Actor 1."

Based on the data in table 700, analysis server 120 may identify clusters based on particular viewer actions. For example, analysis server 120 may identify a cluster of STB2, STB3, and STB4 based on the common relatively high weights for "TV Program 2," "TV Channel 2," and "Actor 2." Analysis server 120 may also identify a cluster of STB4, STB5 and STB6 based on the common relatively high weights for "VOD Program 2."

Analysis server 120 may also assign certain STBs to one or more clusters, such as a global cluster and/or one or more other clusters. For example, because STB7 lacks many individual actions, STB7 may not be assigned to a cluster based on viewer actions. Analysis server 120 may simply assign STB7 to a global cluster. Conversely, STB1 may represent a viewer with a viewing history. In this case, analysis server 120 may assign STB1 to an existing cluster, such as a cluster that includes viewers of "TV channel 1."

As another example, STB4 presents a viewer with a comparatively large amount of viewing history. STB4 may be associated with more than one cluster (such as cluster STB2, STB3, STB4 and cluster STB4, STB5, and STB6 mentioned above) and an individual cluster. Thus, if the individual weights for STB4 (when applied to a new user activity) outweigh any cluster weights, then analysis server 120 may apply the individual cluster tendencies.

Systems and/or methods described herein may determine a relevancy function of viewer tendencies based on set-top box data from a subscription television service and may define a cluster of set-top boxes based on the relevancy function. A tendency profile that predicts actions for viewers within the cluster may be determined for each cluster. A cluster-oriented presentation may then be direct to set-top boxes within each of the clusters.

The foregoing description provides illustration and description, but is not intended to be exhaustive or to limit the implementations to the precise form disclosed. Modifications and variations are possible in light of the above teachings or may be acquired from practice of systems and/or methods disclosed herein.

Also, while series of blocks have been described with regard to the flowchart of FIGS. 4 and 6, the order of the blocks may differ in other implementations. Further, non-dependent acts may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware—such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by one or more computing devices, the method comprising:
   receiving, by the one or more computing devices, set-top box data that includes information regarding a plurality of actions performed by a user of a set-top box,
      the plurality of actions including:
         at least one of conducting a search or viewing an item in a search results list,
         selecting a program to watch, and
         purchasing program content;
   determining, by the one or more computing devices, a weighted relevancy function of viewer tendencies, based on the received set-top box data, by assigning a weight to each of the plurality of actions,
      the weighted relevancy function including television program data, customer use data, and weight criteria for applying the customer use data to the television program data,
      determining the weighted relevancy function including:
         assigning a first weight to conducting the search;
         assigning a second weight to viewing the item in the search results list, the second weight being greater than the first weight;
         assigning a third weight to selecting the program to watch, the third weight being greater than the second weight; and
         assigning a fourth weight to purchasing the program content, the fourth weight being greater than the third weight
   defining, by the one or more computing devices, a cluster of set-top boxes based on the weighted relevancy function;
   building, by the one or more computing devices, a tendency profile for the cluster,
      the tendency profile including predicted actions for viewers associated with the cluster;
   assigning, by the one or more computing devices and based on the tendency profile, the set-top box to the cluster at a first time;
   directing, by the one or more computing devices, a cluster-oriented presentation to the set-top box within the cluster;
   determining, by the one or more computing devices and at a second time, a change in the weighted relevancy function of the viewer tendencies,
      the second time being after the first time; and
   assigning, by the one or more computing devices and based on the determined change in the weighted relevancy function of the viewer tendencies, the set-top box to another cluster,
      the other cluster being different than the cluster.

2. The method of claim 1, further comprising:
   receiving a plurality of set-top box data from a plurality of set-top boxes, the plurality of set-top box data including viewing history and electronic program guide search history for each set-top box; and
   using the received plurality of set-top box data to build the tendency profile for the cluster.

3. The method of claim 1, further comprising:
   modifying a cluster association of the set-top box based on the receipt of additional data from the set-top box.

4. The method of claim 1, where assigning the set-top box to the cluster further comprises:
   assigning the set-top box to a hierarchy of clusters, the hierarchy of clusters including at least two clusters.

5. The method of claim 4, where directing the cluster-oriented presentation to the set-top box within the cluster comprises:
   identifying a specific cluster within the hierarchy of clusters to associate with a particular user activity; and
   directing the cluster-oriented presentation based on the specific cluster.

6. The method of claim 1, where the cluster-oriented presentation comprises one of a video-on-demand (VOD) poster view or a weighted search results list for an electronic program guide (EPG).

7. The method of claim 1, further comprising:
   directing another cluster-oriented presentation to the set-top box assigned to the other cluster,
      the other cluster-oriented presentation being different than the cluster-oriented presentation.

8. A system comprising:
   a memory to store instructions; and
   a processor to execute the instructions to:
      receive set-top box data, from set-top boxes, that includes information regarding a plurality of actions performed by a respective user of each set-top box,
         the plurality of actions including:
            at least one of conducting a search or viewing an item in a search results list,
            selecting a program to watch, and
            purchasing program content;
      determine a weighted relevancy function of viewer tendencies, based on the received set-top box data, by assigning a weight to each of the plurality of actions, the weighted relevancy function including television program data, customer use data, and weight criteria for applying the customer use data to the television program data, and the processor, when determining the weighted relevancy function, being to:
assign a first weight to conducting the search;
assign a second weight to viewing the item in the search results list,
the second weight being greater than the first weight;
assign a third weight to selecting the program to watch,
the third weight being greater than the second weight; and
assign a fourth weight to purchasing the program content,
the fourth weight being greater than the third weight;

define clusters of set-top boxes based on the weighted relevancy function;
build tendency profiles for each of the clusters,
each of the tendency profiles including predicted actions for viewers associated with the clusters;
assign each of the set-top boxes to at least one of the clusters at a first time;
direct a cluster-oriented presentation to set-top boxes within each of the clusters;
determine, at a second time, a change in the weighted relevancy function of viewer tendencies associated with a particular set-top box assigned to a first one of the clusters,
the second time being after the first time; and
assign, based on the determined change in the weighted relevancy function of the viewer tendencies associated with a particular set-top box assigned to the first one of the clusters, the particular set-top to a second one of the clusters,
the second one of the clusters being different than the first one of the clusters.

9. The system of claim 8, where the processor is further to:
send a cluster identifier to one of the set-top boxes, where the cluster-oriented presentation is directed to the one of the set-top boxes based on the cluster identifier.

10. The system of claim 8, where the set-top box data comprises viewing history and electronic program guide search history for each of the set-top boxes.

11. The system of claim 8, where the processor is further to:
modify cluster associations of the set-top boxes based on receipt of additional set-top box data from the set-top boxes.

12. The system of claim 8, where the cluster-oriented presentation comprises one of a video-on-demand (VOD) poster view or a weighted search results list for an electronic program guide (EPG).

13. The system of claim 8, where the processor is further to:
direct another cluster-oriented presentation to the particular set-top assigned to the second one of the clusters,
the other cluster-oriented presentation being different than the cluster-oriented presentation.

14. A method comprising:
receiving, by a device, programming content and one or more cluster identifiers for a subscription television service distributed from a server,
the one or more cluster identifiers each being associated with a set-top box and one or more tendency profiles;

sending, by the device and to the server, information that includes information regarding a plurality of actions performed by a user of the set-top box,
the plurality of actions including:
at least one of conducting a search or viewing an item in a search results list,
selecting a program to watch, and
purchasing program content;

receiving, by the device and from the server, an association of the set-top box with the one or more tendency profiles,
each tendency profile being based on the information and a weighted relevancy function including television program data, customer use data, and weight criteria for applying the customer use data to the television program data,
the weighted relevancy function being determined by:
assigning a first weight to conducting the search;
assigning a second weight to viewing the item in the search results list,
the second weight being greater than the first weight;
assigning a third weight to selecting the program to watch,
the third weight being greater than the second weight; and
assigning a fourth weight to purchasing the program content,
the fourth weight being greater than the third weight, and sending, by the device and to the server, a request for data for a cluster-oriented presentation based on the one or more cluster identifiers and associated one or more tendency profiles;

receiving, by the device and from the server, the data for a cluster-oriented presentation;

providing, for presentation and by the device, the cluster-oriented presentation, based on the data, to the set-top box,
the set-top box being assigned to a first cluster based on the one or more tendency profiles;

sending, by the device and to the server, information that includes information regarding a plurality of other actions performed by the user of the set-top box; and providing, for presentation and by the device, another cluster-oriented presentation,
the other cluster-oriented presentation being different than the cluster-oriented presentation, and
the other cluster-oriented presentation being based on the set-top box being assigned to a second cluster,
the second cluster being different than the first cluster.

15. The method of claim 14, where the cluster-oriented presentation comprises one of a video-on-demand (VOD) poster view, a recommended viewing list, or a weighted search results list for an electronic program guide (EPG).

16. The method of claim 14, further comprising:
receiving, from the server, a cluster identifier,
where, when receiving the data for the cluster-oriented presentation, the method includes:
receiving the data for the cluster-oriented presentation based on the received cluster identifier.

17. A system comprising:
one or more devices to:
collect viewing history data from a plurality of set-top boxes that includes information regarding a plurality of actions performed by a user of a set-top box,
the plurality of actions including:

at least one of conducting a search or viewing an item in a search results list,
selecting a program to watch, and
purchasing program content;
determine a weighted relevancy function of viewer tendencies, based on the collected viewing history data, by assigning a weight to each of the plurality of actions,
the weighted relevancy function including television program data, customer use data, and weight criteria for applying the customer use data to the television program data, and
the one or more devices, when determining the weighted relevancy function, being to:
assign a first weight to conducting the search;
assign a second weight to viewing the item in the search results list,
the second weight being greater than the first weight;
assign a third weight to selecting the program to watch,
the third weight being greater than the second weight; and
assign a fourth weight to purchasing the program content,
the fourth weight being greater than the third weight;
define a cluster of set-top boxes based on the weighted relevancy function;
build a tendency profile for the cluster,
the tendency profile including predicted actions for viewers associated with the cluster;
assign, based on the tendency profile, the set-top box to the cluster at a first time;
direct a cluster-oriented presentation to the set-top box within the cluster;
determine, at a second time, a change in the weighted relevancy function of the viewer tendencies,
the second time being after the first time; and
assign, based on the determined change in the weighted relevancy function of the viewer tendencies, the set-top box to another cluster,
the other cluster being different than the cluster.

18. The system of claim 17, where the viewing history data comprises electronic program guide search history for each of the plurality of set-top boxes.

19. The system of claim 17, where the cluster-oriented presentation comprises one of a video-on-demand (VOD) poster view or a weighted search results list for an electronic program guide (EPG).

20. The system of claim 17, where the one or more devices are further to:
direct another cluster-oriented presentation to the set-top box within the other cluster,
the other cluster-oriented presentation being different than the cluster-oriented presentation.

* * * * *